United States Patent [19]

Nozawa et al.

[11] 4,373,792

[45] Feb. 15, 1983

[54] FLASHLIGHT PHOTOGRAPHING DEVICE

[75] Inventors: Hideyo Nozawa, Ohmiya; Hideshi Naito; Kazuyuki Kazami, both of Tokyo, all of Japan

[73] Assignee: Nippon Kogaku K.K., Tokyo, Japan

[21] Appl. No.: 256,195

[22] Filed: Apr. 21, 1981

[30] Foreign Application Priority Data

| Apr. 25, 1980 [JP] | Japan | 55-55086 |
| Apr. 25, 1980 [JP] | Japan | 55-55087 |
| Apr. 25, 1980 [JP] | Japan | 55-55088 |

[51] Int. Cl.³ .............................. G03B 7/08; G03B 7/16
[52] U.S. Cl. ............................. 354/33; 354/60 F; 354/149; 354/196
[58] Field of Search ............... 354/33, 60 F, 137, 149, 354/196, 289

[56] References Cited

U.S. PATENT DOCUMENTS 3,009,407  11/1961  Brown .................................. 354/196
4,275,953   6/1981  Watanabe et al. ................. 354/60 F

FOREIGN PATENT DOCUMENTS

1235546  6/1971  United Kingdom.

Primary Examiner—Russell E. Adams
Attorney, Agent, or Firm—Fitzpatrick, Cella, Harper & Scinto

[57] ABSTRACT

A flashlight photographing device includes a phototaking lens barrel capable of operatively associating an aperture setting member and a distance adjust member so that the product of an aperture value set by the aperture setting member and an object distance given by the distance adjust member maintains a predetermined value related to the quantity of emitted light of a flash device. The phototaking lens barrel includes structure for releasing the operative association between the aperture setting member and the distance adjust member. The releasing structure is capable of restraining the operation of one of the aperture setting member and the distance adjust member during the operation of the other of such members.

9 Claims, 13 Drawing Figures

| ASA | 25 | | | | | | | 50 | | | | | | | 100 | | | | | | |
|---|---|---|---|---|---|---|---|---|---|---|---|---|---|---|---|---|---|---|---|---|---|
| F \ D | 0.18 | 0.25 | 0.35 | 0.5 | 0.7 | 1 | 1.4 | 0.18 | 0.25 | 0.35 | 0.5 | 0.7 | 1 | 1.4 | 0.18 | 0.25 | 0.35 | 0.5 | 0.7 | 1 | 1.4 |
| 32 | o | | | | | | | o | | | | | | | o | | | | | | |
| 22 | o | o | | | | | | o | o | | | | | | o | o | | | | | |
| 16 | o | o | o | | | | | o | o | o | | | | | o | o | o | | | | |
| 11 | o | o | o | o | | | | o | o | o | o | | | | o | o | o | o | | | |
| 8 | o | o | o | o | o | | | o | o | o | o | o | | | o | o | o | o | o | | |
| 5.6 | o | o | o | o | o | o | | o | o | o | o | o | o | | x | o | o | o | o | o | |
| 4 | o | o | o | o | o | o | o | x | o | o | o | o | o | o | x | x | o | o | o | o | o |

FLASHLIGHT PHOTOGRAPHING DEVICE

BACKGROUND OF THE INVENTION

1. Field of the Invention

This invention relates to a flashlight photographing device, and more particularly to a flashlight photographing device which can be controlled in relation to the phototaking lens and the flash device of a camera.

2. Description of the Prior Art

A lens barrel in which, when the guide number GN of a flash device is set, the aperture value F of a diaphragm is automatically prescribed in accordance with the adjustment of object distance D by a distance adjust ring to satisfy the condition that $GN=D\cdot F$ (when film speed $ASA=100$) is known from British Pat. No. 1,235,546, etc. However, in the lens barrel of this type, there is a disadvantage in that although failure of flashlight photography can be prevented, aperture value is primarily determined for object distance and therefore the freedom of aperture value selection is lost. That is, there are causes where it is desired to effect photography at a shallow depth of field for an object lying at a predetermined distance or conversely where it is desired to effect photography at a great depth of field for such object, but the disadvantage resulting from the want of freedom of selection therebetween must be borne by the photographer.

SUMMARY OF THE INVENTION

It is an object of the present invention to provide an improved flashlight photographing device which enables proper flashlight photography while giving the photographer the freedom of aperture selection.

The improved flashlight photographing device according to the present invention includes a phototaking lens designed to be capable of arbitrarily changing over the operatively associating operation of aperture setting and distance adjustment with the product of aperture value and object distance maintained constant and the operation in which aperture setting is made independent of distance adjustment. Also, the device of the present invention includes a flash device which is capable of introducing thereinto the information of a photographing element including aperture value from the phototaking lens and adjusting the quantity of emitted light on the basis of said information.

The invention will become more fully apparent from the following detailed description thereof taken in conjunction with the accompanying drawings.

DESCRIPTION OF THE PREFERRED EMBODIMENTS

Figure 1:
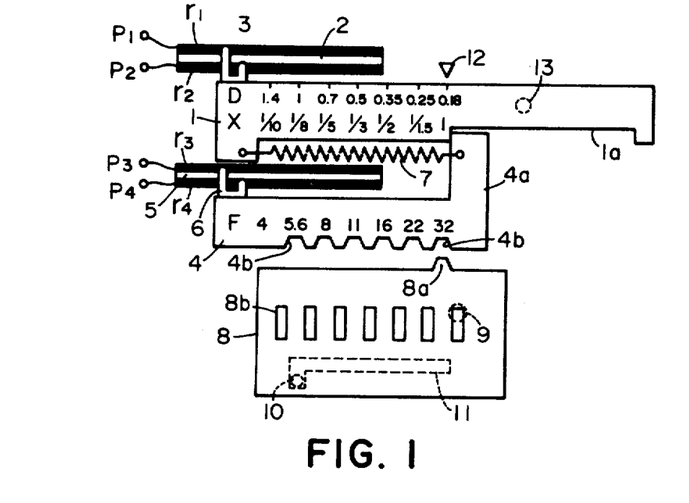
FIGS. 1-3 are theoretical developed views of the phototaking lens according to an embodiment of the present invention.
Figure 2:
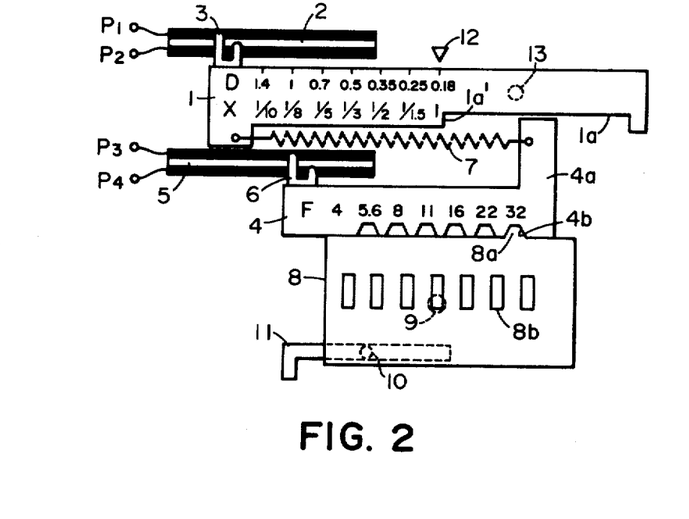
Figure 3:
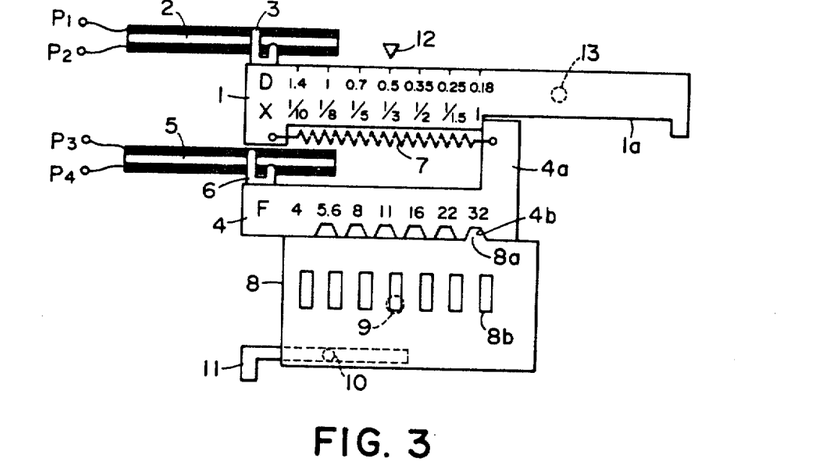

FIGS. 1 to 3 show theoretical developed views of a phototaking lens barrel according to an embodiment of the present invention. In these Figures, the vertical direction is the direction of the optical axis of the lens and the horizontal direction is the direction of rotation about the optical axis of the lens. A distance adjust ring 1 has a brush 3 secured thereto in an insulated condition, the brush 3 being displaceable in accordance with a set object distance. A resistor 2 has resistance bands r1 and r2 and the brush 3 bridges these resistance bands r1 and r2 and is slidable to left and right of the distance adjust ring 1 as viewed in the Figures. The resistance value between terminals P1 and P2, varied by sliding movement of the brush 3 on the resistance bands r1 and r2, is so set as to exhibit a value corresponding to the object distance. The resistor 2 and the brush 3 together constitute a first variable resistor. The distance adjust ring 1 is provided thereon with an object distance scale D and a photographing magnification scale X. A click ball 13 is urged against the distance adjust ring 1 by a spring, not shown. Thus, a predetermined load is exerted on the horizontal movement of the distance adjust ring 1. An aperture ring 4 has a brush 6 secured thereto in an insulated condition, the brush 6 being displaceable in accordance with a set aperture value. A resistor 5 has resistance bands r3 and r4 and the brush 6 bridges these resistance bands r3 and r4 and is slidable to left and right of the aperture ring 4, as viewed in the Figures. The resistance value between terminals P3 and P4, varied by sliding movement of brush 6 on the resistance bands r3 and r4, is so set as to exhibit a value corresponding to the aperture value. The resistor 5 and the brush 6 together constitute a second variable resistor. The aperture ring 4 is provided thereon with an aperture value scale F. A common index mark 12 is provided on the fixed portion of the lens with respect to the scales on the rings 1 and 4. A projection 4a of the aperture ring 4 fits in a cut-away 1a of the distance adjust ring 1. Therefore, the aperture ring 4 is movable only in the area of the cut-away 1a independently with respect to the distance adjust ring 1. A spring 7 is extended between the distance adjust ring 1 and the aperture ring 4 to resiliently couple them together.

The aperture ring 4 has a plurality of engagement recesses 4b formed in regions opposed to the divisions of the aperture value scale.

An aperture selection ring 8 is movable horizontally and vertically as viewed in the Figures. A pin 10 studded in the aperture selection ring 8 and a cam slot 11 formed in the fixed portion guide the aperture selection ring 8 so as to rectilinearly move vertically and horizontally, respectively. An engaging projection 8a projectedly provided on the aperture selection ring 8 is engageable with one of the engagement recesses 4b. The aperture selection ring 8 has a plurality of slits 8b extending in the direction of the optical axis. These slits 8b are provided at intervals corresponding to the intervals between the divisions of the aperture value scale F.

A click ball 9 provided at a location opposed to the slits 8b is urged against the aperture selection ring 8 by a spring, not shown.

The lens barrel of the present embodiment is operable in three different modes which will hereinafter be described.

(1) First Operation Mode: In FIG. 1, the aperture selection ring 8 lies in a position wherein it has been downwardly retracted. In this position, the engagement between an engagement recess 4b and the engaging projection 8a is released and the projection 4a is brought into engagement with the left end of the cut-away 1a. On the other hand, considering the relation between the object distance and the aperture value which are in registry with the fixed index mark 12, D=0.18 m corresponds to F32 and the then guide number is GN≈5.6 as is simply calculated.

When the distance adjust ring 1 is moved rightwardly from the position of FIG. 1 against the pressure force of the click ball 13, the aperture ring 4 is also moved rightwardly therewith. The division of the object distance scale and the division of the aperture value scale which are now in registry with the fixed index mark assume a combination in which GN=D.F≈5.6 is maintained, such as, for example, D=0.25 m and F22 or D=1 m and F5.6. As a matter of course, objective lens position and diaphragm aperture are set to correspond to these divisions.

(2) Second Operation Mode: When the aperture selection ring 8 lying in the first position is shifted upwardly along the cam slot, it reaches a second position with an engagement recess 4b engaged by the engaging projection 8a.

When the aperture selection ring 8 is moved rightwardly along the cam slot 11 from the position in which the engagement recess 4b is engaged by the engaging projection 8a, aperture value is varied toward the open aperture value, such as F22, F16 and so on. The click stop comprising the click ball 9 and the slits 8b is so disposed as to act when each indicated aperture value has come into registry with the fixed index mark 12. FIG. 2 shows the movement in the course of this registration. When the aperture selection ring 8 is returned leftwardly from the position of FIG. 2, aperture value returns to the maximum aperture value. A predetermined friction force is imparted to the distance adjust ring 1 against which the click ball 13 is urged. This friction force is set to be greater than the restitutional force of the spring 7 and the distance adjust ring 1 of FIG. 2 is stopped at a predetermined position. Accordingly, any deviation of the focus position during arbitrary aperture value selecting operation is prevented.

This second operation mode is applicable whatever aperture value other than F4 is selected by the aperture ring 4. That is, since a plurality of engagement recesses 4b are provided in opposed relationship with the divisions of the aperture value scale, the engaging projection 8a can engage a recess 4b in the second position thereof as long as the aperture ring 4 is set within the aperture value range of F32 to F5.6.

(3) Third Operation Mode: The distance adjust ring 1 is moved rightwardly from the position of FIG. 2 to change the object distance. At this time, the aperture ring 4 is stopped from moving by the click stop which acts on the aperture selection ring 8. Accordingly, the distance adjust ring 1 alone moves independently. At the terminal end of the independent movement of the distance adjust ring 1, as shown in FIG. 3, the left end of the cut-away 1a of the distance adjust ring 1 is engaged with the projection 4a of the aperture ring 4. When the distance adjust ring 1 is further moved rightwardly from this position, the aperture ring 4 and the aperture selection ring 8 together follow it. This operation is substantially the same as the first operation mode.

To release the third operation mode, it is necessary that the aperture selection ring 8 be returned to the position of FIG. 1 (so that the aperture value set by the aperture ring 4 is F32) and the aperture selection ring 8 be downwardly shifted to the first position.

Figure 4A:
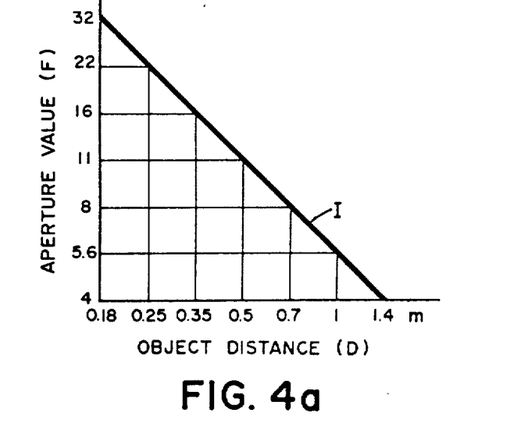
FIGS. 4A-4C are graphs illustrating the relation between aperture value and object distance.
Figure 4B:
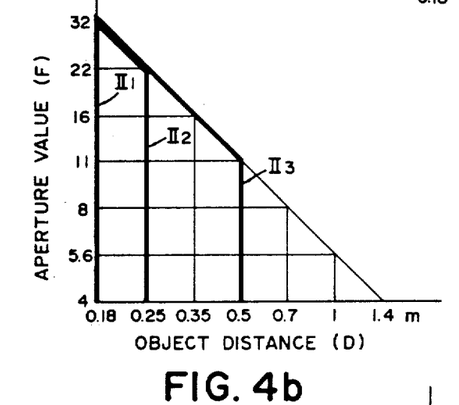
Figure 4C:
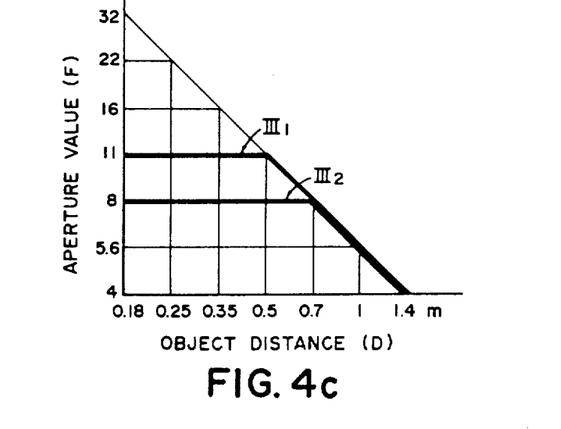

The relation between aperture value and object distance by each of the above-described first to third operation modes will be described with reference to FIGS. 4A–4C. When the phototaking lens has been selected to the first operation mode, the distance adjust ring 1 and the aperture ring 4 are operatively associated with each other so that aperture value is varied along the line I of FIG. 4A. When the phototaking lens has been selected to the second operation mode, there are given an area in which aperture value is variable independently of object distance and an area in which aperture value is variable with variation in object distance involved. For example, when the ring 8 is upwardly moved in the position of FIG. 1 wherein distance is set to 0.18 m and the ring 8 is operated rightwardly together with the ring 4 with the projection 8a engaging a recess 4b opposed to F32, aperture value is varied independently of object distance as indicated by line II$_1$ in FIG. 4B, whereas when the ring 1 and ring 4 of FIG. 1 has been rightwardly operated over one step while being linked together and at a position in which distance is set to 0.25 m, the ring 8 is rightwardly operated together with the ring 4 with the projection 8a engaging a recess 4b opposed to F22, aperture value is varied between F4 to F22 independently of distance as indicated by line II$_2$ in FIG. 4B, and is varied between F22 to F32 in association with distance. Further, when distance is set to 0.5 m and the projection 8a engages a recess 4b opposed to F11, there is obtained a variation as indicated by line II$_3$ in FIG. 4B. When the phototaking lens has been selected to the third operation mode, there are given an area in which object distance is variable independently of aperture value and an area in which object distance is variable with variation in aperture value involved. For example, when the ring 1 is rightwardly operated in a position wherein aperture value is set to F11 as shown in FIG. 2, object distance is varied between D=0.18 m to D=0.5 m independently of aperture value as indicated by line III$_1$ in FIG. 4C and if object distance exceeds 0.5 m, aperture value is varied. When the aperture ring of FIG. 2 is rightwardly operated over one step and the ring 1 is operated in a position wherein aperture value is set to F8, there is obtained a variation as indicated by line III$_2$ in FIG. 4C.

Figure 5:
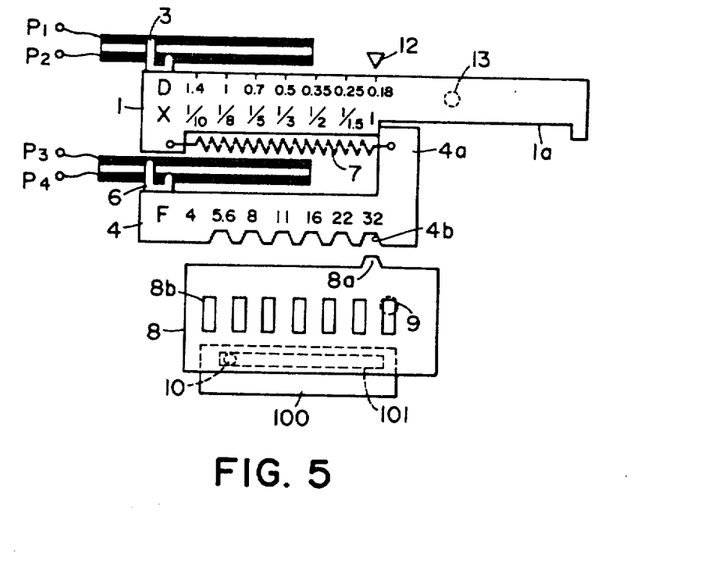
FIG. 5 is a theoretical developed view of the phototaking lens according to another embodiment of the present invention.

FIG. 5 shows a phototaking lens barrel according to another embodiment of the present invention.

In this embodiment, change-over from the first operation mode to the second operation mode or from the second operation mode to the third operation mode is possible irrespective of the set value of object distance. A pin 10 studded in an aperture selection ring 8 fits in a straight guide slot 101 formed in a slide ring 100 movable in the direction of the optical axis. Accordingly, based upon whatever value between 0.18 m to 1 m at which the object distance may be set, when the aperture selection ring 8 and the slide ring 100 are upwardly moved as viewed in the Figure, an engaging projection 8a engages one of engagement recesses 4b to thereby enable aperture selection in the second operation mode. In the second operation mode, the aperture selection ring 8 is moved to left and right by being guided by the straight guide slot as viewed in the Figure. Further, in the second operation mode, when the aperture selection ring 8 is pulled downwardly with the slide ring 100 as viewed in the Figure, there is brought about the third operation mode.

Description will now be made of an embodiment of a flash device suitable for the above-described embodiments.

Figure 6:
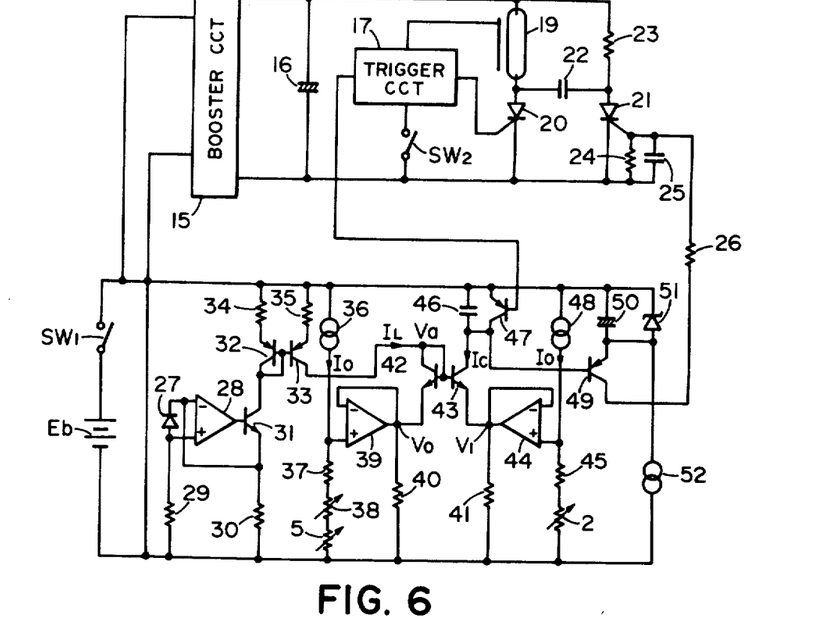
FIG. 6 is a circuit diagram of the flash device according to an embodiment of the present invention.

FIG. 6 is an electric circuit diagram showing an embodiment of the flash device which automatically controls the quantity of emitted flashlight.

When the operating switch SW1 of a power source Eb is closed, a high voltage boosted by a DC booster circuit 15 is charged into a main capacitor 16. When a synchro switch SW2 is closed in synchronism with movement of the shutter of a camera after the main capacitor 16 has been charged to a voltage at which flashlight emission is possible, a well-known trigger circuit 17 is operated to trigger a discharge tube 19 and at the same time, turn on a thyristor 20. Thus, the discharge tube emits flashlight. This flashlight emission is discontinued by a commutation thyristor 21 receiving a light output control signal.

A variable resistor 38 is operatively associated with a film speed setting dial, not shown, and may be operated so that its resistance value is increased with an increase in film speed. The aforementioned second variable resistor 5 is series-connected to the variable resistor 38 and, with a fixed resistor 37, it is connected to the non-inverting input terminal of an operational amplifier 39. The aforementioned variable resistor 2 series-connected to a fixed resistor 45 is connected to the non-inverting input terminal of an operational amplifier 44. Accordingly, information such as film speed, aperture value and object distance is applied in the form of a voltage to the operational amplifiers 39 and 44 by constant current sources 36 and 48. That is, a voltage corresponding to film speed and aperture value appears at the output of the operational amplifier 39, and a voltage corresponding to object distance appears at the output of the operational amplifier 44. The resistors 37 and 45 are provided to shift the input voltages of the operational amplifiers 39 and 44 to an area in which these operational amplifiers effect stable operation.

When the synchro switch SW2 is closed and the discharge tube 19 emits light, a photocurrent is produced in a light-receiving element 27 which directly meters the discharge tube 19, and this photocurrent is suitably amplified by an amplifier circuit comprising an operational amplifier 28, transistors 31, 32, 33, and resistors 29, 30, 34, 35, and is applied as input to a transistor 42. Transistors 42 and 43 have their bases connected to each other. The base potential of the transistor 42 assumes a value equal to the base-emitter voltage determined by the amplified photocurrent plus the output voltage of the operational amplifier 39 set by the information of film speed and aperture. The emitter potential of the transistor 43 is the output voltage itself of the operational amplifier 44 set by the information of object distance. Accordingly, the value of the current charging an integrating capacitor 46 is set by the base-emitter voltage of the transistor 43. A transistor 47 is normally conductive to short-circuit the integrating capacitor 46 and is rendered non-conductive by the action of the trigger circuit 17 simultaneously with the light emission of the discharge tube 19.

In this manner, the integrating capacitor 46 is charged by the transistor 43 simultaneously with flashlight emission. When the integrating capacitor 46 is charged to a voltage equal to a reference voltage set by a constant current source 52, a constant voltage diode 51 and a capacitor 50 plus the base-emitter voltage of a transistor 49, the transistor 49 is turned on so that a voltage is applied to the gate of the commutation thyristor 21 through resistor 26. As a result, the commutation thyristor 21 is turned on and thyristor 20 is reversely biased and turned off by capacitor 22, whereupon the light emission of the flashlight discharge tube 19 is discontinued. Accordingly, the quantity of emitted flashlight is determined by the charging time, i.e., charging current, of the integrating capacitor 46 (the collector current of the transistor 43).

This relation will be formulated below. Let $I_0$ be the current values of both constant curent sources 36 and 48, $V_0$ and $V_1$ be the output voltages of operational amplifiers 39 and 44, respectively, Va be the base voltages of transistors 42 and 43, and $I_L$ be the amplified photocurrent, namely, the collector current of transistor 33. Then, $$V_0 = I_0(R37 + R38 + R5)$$

$$V_1 = I_0(R45 + R2)$$

$$V_a = V_0 + (kT/q)b(IL/IS)$$

where
k: Boltzmann constant
T: absolute temperature
q: charge of electron
$I_S$: reverse saturated current of diode From the foregoing equations, the charging current, namely, the collector current Ic of transistor 43 is:

$$I_c = I_L \exp\left( \frac{I_0(R37 + R28 + R5 - R45 - R2) \cdot q}{kT} \right)$$

Accordingly, in the case of the aforementioned first operation mode, if the resistance value per step is made equal, for example, the object distance becomes shorter by one step and, if the resistance value of R2 is increased, the aperture value is stopped down by one step, that is, the resistance value of the variable resistor R5 is increased by the same amount as the variation in resistance value resulting from the variation in distance. That is, in this condition, the charging current of the integrating capacitor is constant. The term "step" is a unit representing the amounts of variation in aperture value and object distance for satisfying the foregoing equation so that when, for example, aperture value varies from F5.6 to F8 so as to satisfy the condition that GN=D·F, object distance D varies from 1 m to 0.7 m. After all, in the first operation mode, the charging current is varied only by the information of film speed. In this case, however, the resistance value of the variable resistor 38 must be set so that each time the information of film speed is varied by one step, the charging current Ic of the integrating capacitor becomes doubled or halved.

For example, when film speed is changed from ASA100 to ASA200, Ic doubles; when film speed is changed from ASA100 to ASA400, Ic quadruples; and when film speed is changed from ASA100 to ASA50, Ic is halved.

In the case of the second operation mode, if aperture value alone is varied with object distance fixed, the resistance value of the variable resistor 5 is correspondingly varied and the output voltage of the operational amplifier 39 is varied. Accordingly, the base-emitter voltage of the transistor 43 is varied and therefore, the charging current Ic of the integrating capacitor is varied. In this case, however, assuming that, for example, aperture value F32 is reduced by four steps, i.e., to F11, $2^4$ times the charging current Ic flows. That is, flashlight emission is discontinued early so that proper exposure may be effected. Consequently, the resistance value of the resistor 5 is varied so that the current value is doubled or halved for one step variation (if the base-emitter voltage of the transistor 43 is varied by 17.5 mV, the collector current Ic is varied is halved).

For example, when aperture value is changed from F5.6 to F8, Ic is halved; when aperture value is changed from F5.6 to F11, Ic is quartered; and when aperture value is changed from F5.6 to F4, Ic is doubled.

In this manner, the decrease in guide number when aperture value has been reduced with object distance fixed at a predetermined value is corrected by shortening the flashlight emission time of the flashlight discharge tube 19 and as a result, proper exposure is obtained.

In the third operation mode, when object distance is varied with aperture value fixed at a predetermined value, the resistance value of the object distance resistor 2 is also varied as already described in connection with FIG. 2 and therefore, a proper quantity of emitted light is correspondingly obtained. That is, the resistance value of the variable resistor 2 is varied so that when the object distance D is adjusted from 0.17 m to 0.25 m, Ic is halved and that when the object distance D is adjusted from 0.17 m to 0.35 m, Ic is quartered.

In this manner, the increase in guide number caused by adjusting the object distance to the long distance side when aperture value is fixed at a predetermined value is corrected by prolonging the flashlight emission time of the flashlight discharge tube 19.

The embodiment of FIG. 6 is theoretically capable of effecting the light output control operation for obtaining a proper quantity of emitted light in all combinations of film speed, aperture value and distance. Actually, however, even after the turn-off of the main thyristor during the stoppage of the light emission of the discharge tube, the discharging current of the discharge tube flows through the commutation capacitor for a very short time and flashlight is emitted. The residual flashlight after the turn-off of the main thyristor persists for a very short time and therefore, when the whole quantity of emitted light is great as in the case of a distant object, the quantity of such residual flashlight is almost negligible, but in the case of a very near object, the necessary quantity of emitted light is small and therefore, the influence of the residual flashlight appears and over-exposure is provided. Thus, it is necessary to effect correction in accordance with reduction in quantity of emitted light.

When the phototaking lens according to the embodiment of FIGS. 1 to 3 is considered, the influence of the aforementioned residual flashlight resulting from the reduction in quantity of emitted light appears during the flashlight photography by the second or the third operation mode. That is, the quantity of emitted light of the controlled flash device decreases with the operation of the phototaking lens according to the line II of FIG. 4B wherein aperture value is varied from F11 to F4 with object distance D fixed at 0.5 m or the operation of the phototaking lens according to the line III of FIG. 4C wherein object distance D is varied from 0.5 m to 0.18 m with aperture value fixed at F11. Furthermore, in any of the first to third operation modes, the quantity of emitted light is decreased by increase in film speed.

Figure 7:
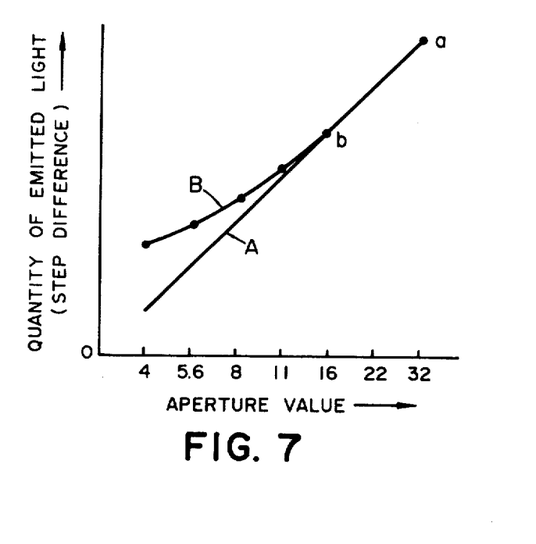
FIG. 7 is a graph showing the comparison of the quantity of emitted light of the FIG. 6 flash device with a theoretical value.

When any one of the film speed resistor 38, aperture resistor 5 and distance resistor 2 in the circuit of FIG. 6 is varied, the controlled quantity of emitted light becomes such as indicated by curve B of FIG. 7. For example, when a case where the aperture resistor 5 is varied is considered, the quantity of emitted light when aperture value is selected to F32 in the first operation mode is indicated by point a; the theoretical value of the quantity of emitted light when the aperture has been opened by each step in the second operation mode is indicated by straight line A; and the actual value of the quantity of emitted light subjected to the influence of the residual quantity of light is indicated by curve B. From this it is seen that the quantity of emitted light becomes gradually excessive with point b as the boundary.

Figure 8:
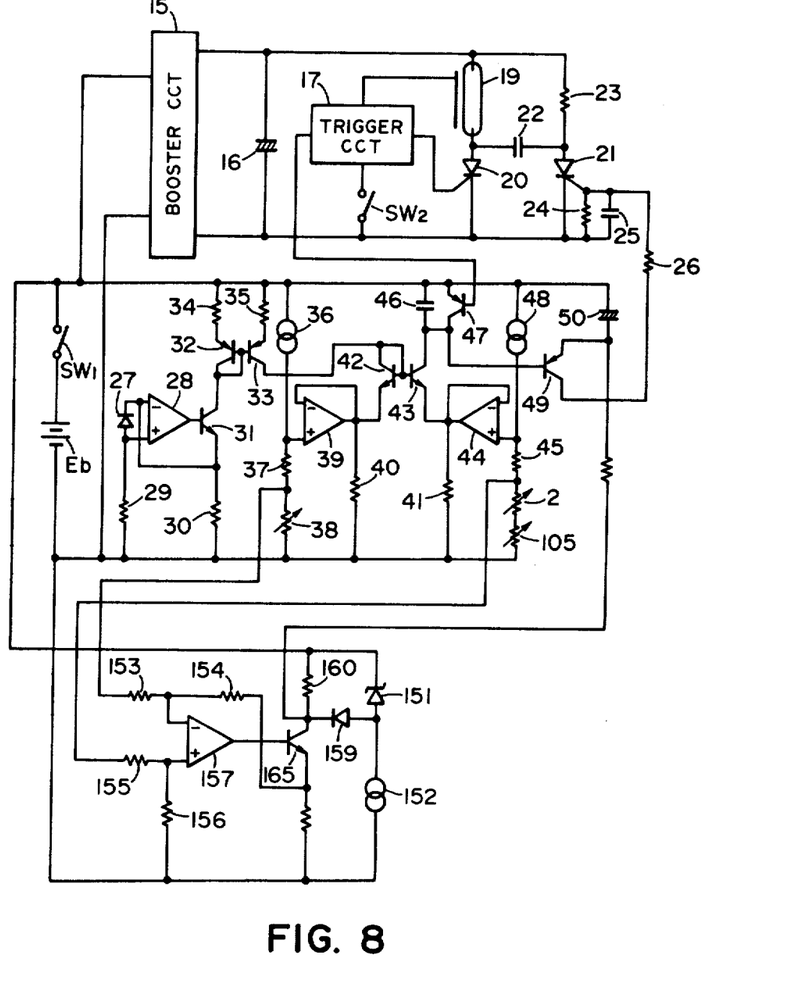
FIG. 8 is a circuit diagram of the flash device according to another embodiment of the present invention.

FIG. 8 shows an embodiment of the circuit which overcomes the above-noted disadvantage by imparting a correction to the reference voltage unit for producing a light output control output. A second variable resistor 105 operatively associated with the aperture ring is set so that, conversely to the previous embodiment, its resistance value is increased as the aperture is stopped down from the open aperture, and this second variable resistor 105 is series-connected to the first variable resistor 2. The voltage values imparted by these resistors 2 and 105, with the voltage value imparted by the film speed resistor 38, are applied as inputs to a subtraction circuit comprising resistors 153, 154, 155, 156 and an operational amplifier 157. Accordingly, at the emitter of transistor 165, a voltage representing the difference between the voltage by aperture information and distance information and the voltage by film speed information appears while being multiplied by the ratio of the resistor 153 and 154. Assuming that film speed is constant and that object distance is also fixed, the emitter voltage of transistor 165 is varied by aperture information alone. The more stopped down the aperture, the higher the emitter voltage of transistor 165. Accordingly, the more stopped down the aperture, the greater the collector current of transistor 165. When the collector current of this transistor 165 is great, that is, when the voltage drop of resistor 160 becomes great, the collector potential of transistor 49 is clamped by a clamp circuit comprising a constant voltage diode 151, a constant current source 152 and a diode 159. Accordingly, when the value of variable resistor 105 is great (when the aperture is stopped down), the potential of capacitor 50 is clamped and constant. However, when aperture becomes approximate to the open aperture and the value of variable resistor 105 is decreased, the emitter voltage of transistor 165 drops and the collector current of transistor 49 decreases and therefore, the voltage drop of resistor 160 is decreased and comes out of the clamped area. Accordingly, the potential of capacitor 50 which is the reference voltage rises and a light output control output is produced earlier than the theoretical value.

Figure 9:
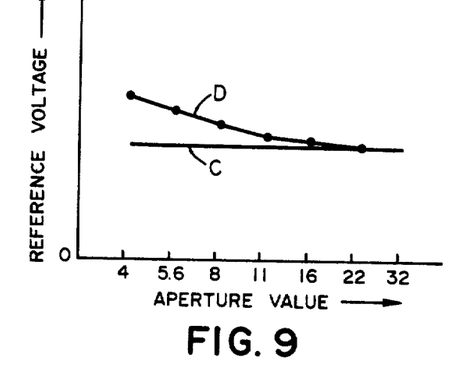
FIG. 9 is a graph illustrating the reference voltage characteristic of the FIG. 8 embodiment.

FIG. 9 shows the variation in reference voltage resulting from this correction. In FIG. 9, straight line C refers to a case where the correction is not effected, and curve D refers to a case where suitable correction has been effected. Accordingly, if the value of resistor 60 is suitably selected in accordance with an empirical value, there will be obtained the quantity of light for providing a proper exposure amount.

Figure 10:
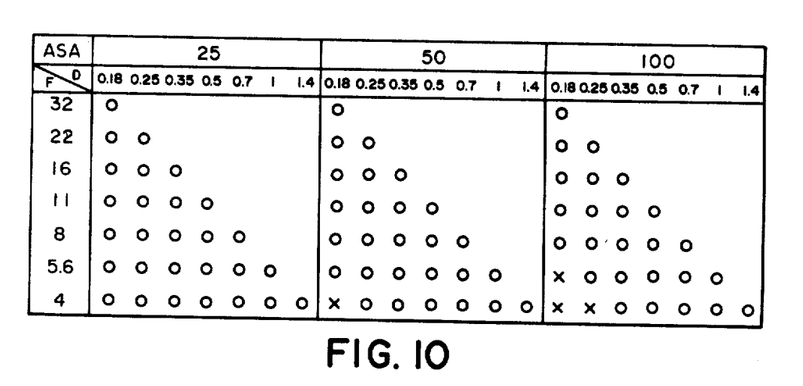
FIG. 10 shows the control range of the FIG. 8 flash device.
Figure 11:
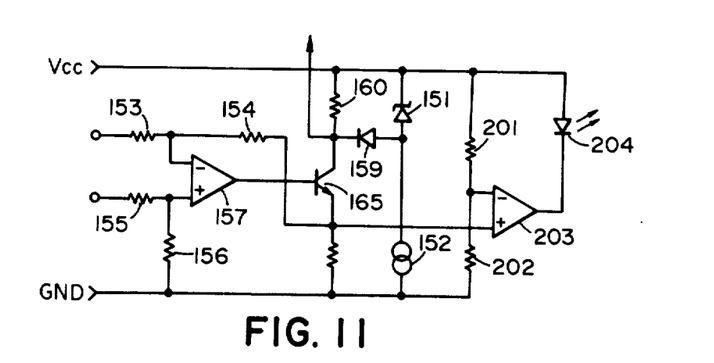
FIG. 11 is a circuit diagram showing portions of the flash device according to still another embodiment of the present invention.

However, it is not infinitely possible even when the quantity of light is decreased in a stage-like fashion for a maximum quantity of emitted light, but of course there are combinations which, at a certain point, will enter into an area in which light output control is impossible, namely, a range in which flashlight emission can be discontinued no earlier even if any correction is imparted. FIG. 10 shows such combination. It is to be understood that the quantity of emitted light of the flash device by the first operation mode when film speed is ASA25 is the maximum and that the phototaking lens is capable of effecting six steps of aperture selection from that maximum. That is, in the case of ASA25, a proper quantity of emitted light can be obtained in all combinations of aperture and distance if the combinations are within the area confined by the straight line I shown in FIG. 4a. In the case of ASA50, the quantity of emitted light is reduced by one step with respect to ASA25 and as a result, in combinations of aperture and distance, the quantity of emitted light can be varied only by five steps. That is, the combination of D=0.18 m and F4 cannot electrically control the light emission. This impossibility becomes greater as film speed is increased. FIG. 11 shows an embodiment in which a warning circuit is added as the countermeasure therefor.

That is, in the combination of three types of information, i.e., aperture value, object distance and film speed, the minimum quantity of emitted light GNmin which is controllable in any case is constant from the construction of the electric circuit, and the emitter voltage of the transistor for obtaining the minimum quantity of emitted light, namely, the potential calculated from the combination of said three types of information, is predetermined. Therefore, a reference voltage corresponding to the minimum quantity of emitted light GNmin is set by resistors 201 and 202 and is compared with the emitter voltage of transistor 65 by a voltage comparator 203, and at a stage whereat this emitter voltage has dropped below the reference voltage, LED204 may be turned on to warn about the impossibility of light output control.

We claim:

1. In a flashlight photographing device including a phototaking lens barrel capable of operatively associating an aperture setting member and a distance adjust member with each other so that the product of an aperture value set by said aperture setting member and an object distance given by said distance adjust member maintains a predetermined value related to the quantity of emitted light of a flash device, the improvement residing in that said phototaking lens barrel includes means for releasing the operative association between said aperture setting member and said distance adjust member; and means for regulating the action of said releasing means to enable independent operations of said aperture setting member and said distance adjust member only within a range in which the product of said aperture value and said object distance does not exceed said predetermined value.

2. A flashlight photographing device according to claim 1, wherein said phototaking lens barrel further includes means for setting the range in which said operative association is established and the range in which said operative association is released by said releasing means within the ranges of the settable aperture value of said phototaking lens and the object distance.

3. A flashlight photographing device according to claim 2, wherein said setting means includes means responsive to any variation in the aperture value caused by operation of said aperture setting member for setting the range of the object distance, and means responsive to any variation in the object distance caused by said distance adjust member for setting the range of the aperture value.

4. A flashlight photographing device according to claim 1, wherein said flashlight photographing device introduces into said flash device aperture information corresponding to the aperture value set by said aperture setting member and distance information corresponding to the object distance given by said distance adjust member and wherein said flash device includes a control circuit for controlling the quantity of emitted light so as to correspond to the product of the aperture value obtained from said aperture information and the object distance obtained from said distance information.

5. A flashlight photographing device according to claim 4, wherein said flash device has a flashlight tube, a switching element series-connected to said flashlight tube, a trigger circuit for rendering said switching element conductive, and a light output control circuit for rendering said switching element non-conductive, and wherein said control circuit includes a correction circuit for operating said light output control circuit so that the time from the operation of said trigger circuit until the operation of said light output control circuit is shorter than the theoretical light emission time of said flashlight tube calculated on the basis of an element for determining exposure including the aperture value and the object distance, and said correction circuit operates so that said time becomes shorter as the product of said aperture value and said object distance becomes smaller.

6. A flashlight photographing device according to claim 1, wherein said releasing means including means for restraining the operation of one of said aperture setting member and said distance adjust member during the operation of the other of said aperture setting member and said distance adjust member.

7. In a flash device capable of introducing therein information of the aperture value of a photo-taking lens set during photography and information of an object distance and including a flash light tube, a switching element series-connected to said flashlight tube, a trigger circuit for rendering said switching element conductive, and a light output control circuit for rendering said switching element non-conductive, the improvement comprising:

a control circuit for producing a control signal to operate said light output control circuit so that the quantity of emitted light of said flashlight tube corresponds to the product of said aperture value and said object distance, and a correction circuit producing a correction signal for actuating said light output control circuit, a predetermined time earlier than the time when said control signal is produced by said control circuit, said correction circuit operating, in response to said information, so that said predetermined time becomes greater as the product of said aperture value and said object distance becomes smaller.

8. In a flashlight photographing device including a phototaking lens barrel capable of operatively associating an aperture setting member and a distance adjust member with each other so that the product of an aperture value set by said aperture setting member and an object distance given by said distance adjust member maintains a predetermined value related to the quantity of emitted light of a flash device, the improvement residing in that said phototaking lens barrel includes means for enabling the relative movement of said aperture setting member and said distance adjust member in a direction only that the product of said aperture value and said object distance becomes smaller than said predetermined value.

9. A phototaking lens barrel comprising:
(a) means for selecting an aperture value;
(b) means for adjusting an object distance;
(c) said selecting means and said adjusting means being movable independently from each other;
(d) means for connecting said selecting means and said adjusting means at the relative position thereof at which the product of said aperture value and said object distance is a predetermined value, the connecting means allowing the selecting means to move from that position in a direction increasing the aperture value and the adjusting means to move from that position in a direction increasing the object distance;
(e) biasing means disposed between said selecting means and said adjusting means and acting to increase the product of said aperture value and said object distance.

* * * * *